United States Patent
Dolbear

[15] 3,693,071
[45] Sept. 19, 1972

[54] METHOD FOR DETERMINING OCTANE RATINGS FOR GASOLINES

[72] Inventor: Geoffrey Emerson Dolbear, Columbia, Md.

[73] Assignee: W. R. Grace & Co., New York, N.Y.

[22] Filed: Oct. 15, 1970

[21] Appl. No.: 80,830

[52] U.S. Cl..................324/0.5 R, 23/230, 73/35
[51] Int. Cl..................................G01n 27/78
[58] Field of Search..............324/0.5; 73/35; 23/230

[56] References Cited

UNITED STATES PATENTS

| | | | |
|---|---|---|---|
| 2,871,443 | 1/1959 | Williams | 324/0.5 R |
| 2,888,638 | 5/1959 | Nelson | 324/0.5 R |

Primary Examiner—Michael J. Lynch
Attorney—Michael J. McGreal and Kenneth E. Prince

[57] ABSTRACT

The octane number of a gasoline can be accurately determined using nuclear magnetic resonance analysis. The The octane numbers, research octane number and motor octane number, can be determined by a linear correlation of allylic or olefinic and aromatic hydrogen concentrations. The gasoline which is to be analyzed is usually flowed through an NMR cell containing a magnet, R.F. source and antenna, with an output indicating the quantitative presence of the differing types of hydrogens. By the linear correlation of the degree of presence of the specific hydrogens, the octane numbers are determined. These octane rating devices can be used to control plant streams where varying grades of gasoline are formulated.

12 Claims, 5 Drawing Figures

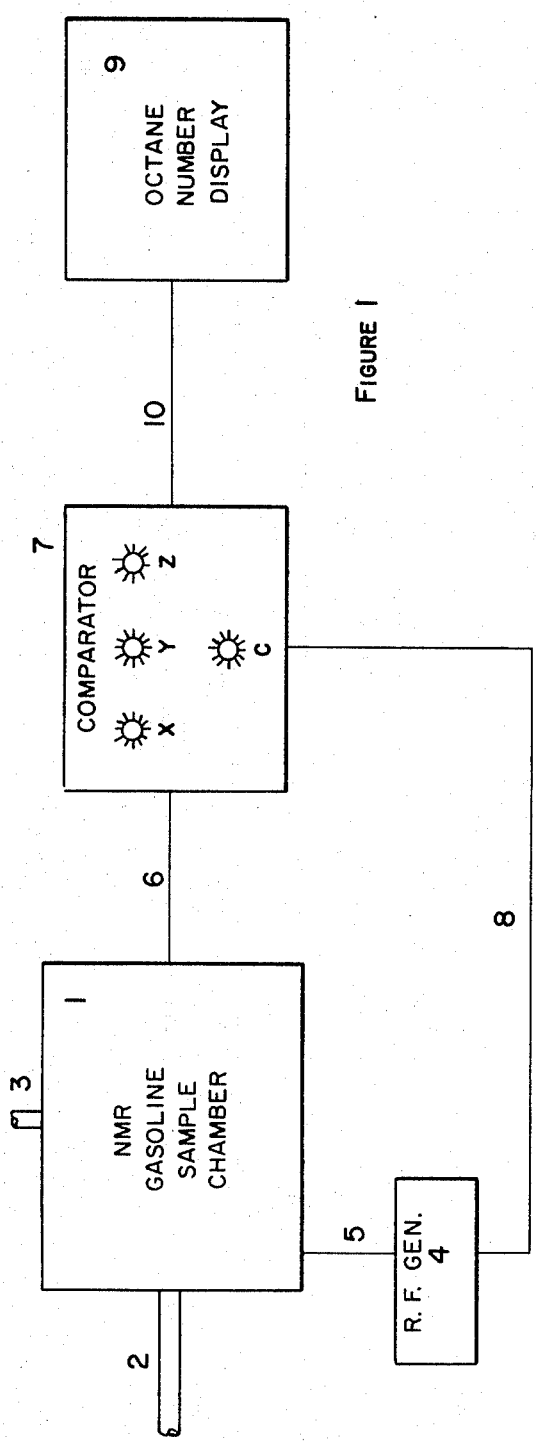
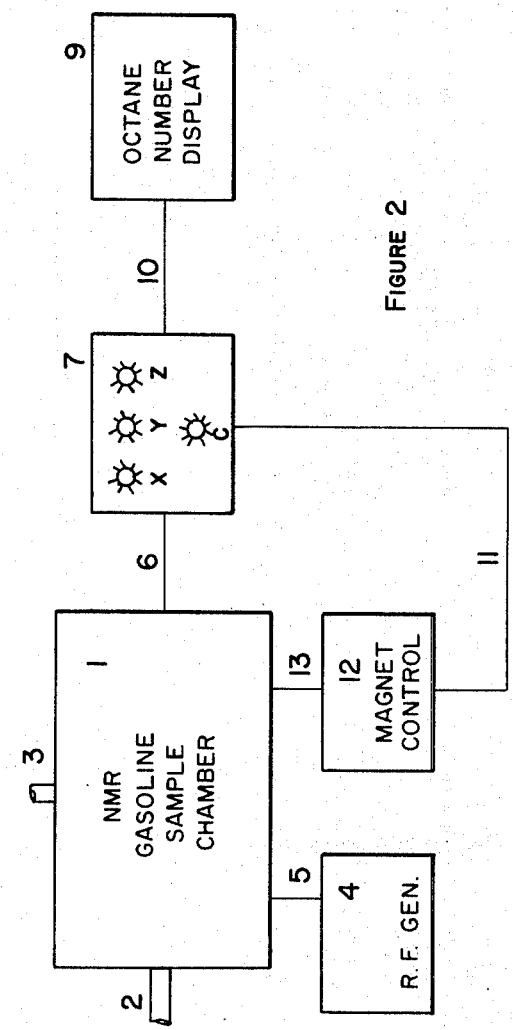

INVENTOR
Geoffrey E. Dolbear

BY *Michael J. McGreal*

ATTORNEY

METHOD FOR DETERMINING OCTANE RATINGS FOR GASOLINES

BACKGROUND OF THE INVENTION

This invention relates to a device for determining the octane number of gasoline, and more particularly to an nmr type octane rating device.

This invention further relates to a method for determining the octane rating of gasolines. More specifically, this invention relates to a method wherein the octane number of gasoline is determined by a comparison on an nmr (nuclear magnetic resonance) spectra of the olefinic, aromatic and allylic hydrogen distributions.

At present, there is a particular need, both in the research facility and plant, for a rapid technique for determining the octane ratings of gasolines. This need has further been accelerated by recent efforts to ban lead additives from gasolines. When lead additives are removed, high octane can be maintained by increasing the olefinic and aromatic contents of the gasoline. It is well known that the unsaturation of olefins and aromatic molecules tend to increase the octane number of gasoline. On the removal of lead additives from gasoline, one method for controlling the octane number of high octane gasolines will be controlling the blend of gasoline and thus the octane number.

Presently, there are two main art defined techniques for determining octane number. These techniques evolved in the 1930's. The first is the Motor Octane Number (MON) method, ASTM D-357. The second is the Research Octane Number (RON) method ASTM D-908. Both methods utilize the Cooperative Fuel Research (CFR) knock test engine. Basically, this is a single cylinder, four stroke engine in which the compression ratio can be varied. Auxiliary equipment includes a pickup unit to detect pressure impulses from detonation, an electronic amplifier, and a knock meter to record knock intensity. To determine a fuel's antiknock quality, the CFR engine is operated on the fuel under a standard set of conditions, and its compression ratio is adjusted to give a standard level of knock intensity. This knock level is then bracketed by two blends of reference fuels for which the octane numbers are known. By the recorded knock levels of the bracketing reference fuels and the unknown fuel, the octane number of the unknown can be interpolated. Advantageously, these methods, RON and MON, do give accurate reproducible results. However, they do require experienced operators, periods of time of about a half hour, and sample quantities of up to a liter or more. The present invention provides a method with the advantage of the RON and MON techniques, but without the disadvantages. Using the nmr technique of the present invention, samples as low as 0.1 ml. can be used, and yet give accurate and reproducible results. Further, nmr equipment can be automated for direct readout or recording. Also, such equipment as part of an inline blending apparatus can also be used to control the octane number of the blended product.

It is an object of this invention to determine the Research Octane and Motor Octane Numbers of gasoline using an nmr technique.

It is additionally an object of this invention to determine the Research Octane Number of a gasoline from the allylic hydrogen content of the gasoline.

It is also an object of this invention to disclose a device which rapidly and reproducibly determines the octane rating of gasolines.

It is further an object of this invention to set out a device for the continuous monitoring of gasoline feed streams in blending plant operations.

It is additionally an object of this invention to set out a simple method by which from the nmr designated hydrogen component contents of a gasoline, its octane number can be determined.

It is further an object of this invention to set out an nmr method by which the octane number can be determined from the aromatic hydrogen and olefinic hydrogen content of the gasoline.

BRIEF SUMMARY OF THE INVENTION

This invention comprises a device and method for determining the octane number of gasolines, using nmr and a comparison of the distribution of hydrogen atoms among aromatic, olefinic and paraffinic components of the gasoline. This distribution of hydrogen atoms correlates with both the research octane number and motor octane number.

BRIEF DESCRIPTION OF THE DRAWINGS

FIG. 1 is a schematic of the octane rating device utilizing a frequency sweep.

FIG. 2 is a schematic of the octane rating device utilizing magnetic field sweep.

DETAILED DESCRIPTION OF THE INVENTION

Figure 3:
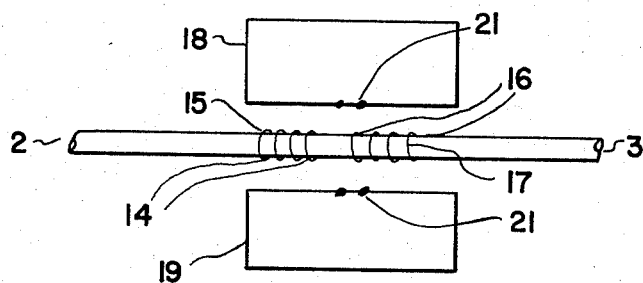
FIG. 3 is a plan view of the sample chamber of the octane rating device.

Broadly, this invention comprises a device and method for accurately and reproducibly analyzing a gasoline to determine the octane number rating of that gasoline. By this method, any one of the two types of octane numbers can be determined. This includes the Research Octane Number (RON) and Motor Octane Number (MON). The method consists essentially in using the distribution of aromatic and olefinic, or allylic hydrogens in the gasoline mixture. This is accomplished by determining the nuclear magnetic resonance signature of the gasoline, wherein the above types of hydrogens have different resonant frequencies. The total resonant energy exhibited at a frequency is then indicative of the quantitative content of that kind of hydrogen. The total integrated resonant energy for each type of particular hydrogen is automatically calculated by any of a number of known techniques, and this data processed by a comparator to determine the relationship between each of the types of hydrogens, with the resulting octane number rating displayed by a conventional readout device.

Uniquely, it has been found that there exists a relationship between the RON and MON, with the different types of hydrogens in the gasoline mixture. And an nmr device looks at the hydrogen atoms of a molecule, each kind of hydrogen yielding a different spectra. In essence, the nucleus of the hydrogen atom consists solely of a single proton. In nmr, this nucleus will orient itself in a magnetic field, this state being the resonant energy condition. To a first approximation, all hydrogens should be orientable in such a magnetic field at the same energy level. However, this does not consider the effect of neighboring atoms. Neighboring magnetic field and $\gamma$ the gyromagnetic ratio. As is evident from this equation, since the input R.F. varies directly as the magnetic field, either can be adjusted to attain the resonance level. Table 1 sets out a listing of various magnetic field strengths and corresponding radio frequencies which have been found to be most useful in viewing the hydrogens of gasoline.

TABLE I

| Ho | $\mu$ (mc.) | Allylic H (cps.)* | | | Olefinic H (cps.)* | | | Aromatic H (cps.)* | | |
|---|---|---|---|---|---|---|---|---|---|---|
| | | From | To | Range | From | To | Range | From | To | Range |
| 1,000 | 4.257 | −7.6 | −14.2 | 6.6 | −17.0 | −25.5 | 8.5 | −27.7 | −34.1 | 6.4 |
| 1,935 | 8.238 | −14.8 | −27.4 | 12.6 | −33.0 | −49.4 | 16.4 | −53.6 | −65.9 | 12.3 |
| 3,000 | 12.772 | −23.0 | −42.5 | 19.5 | −51.1 | −76.6 | 25.5 | −83.0 | −102.2 | 19.2 |
| 5,000 | 21.287 | −38.3 | −70.9 | 32.6 | −85.2 | −127.7 | 42.5 | −138.4 | −170.3 | 31.9 |
| 10,000 | 42.574 | −76.6 | −141.8 | 65.2 | −170.3 | −255.4 | 85.1 | −276.7 | −340.6 | 63.9 |
| 14,100 | 60.03 | −108.0 | −199.9 | 92.0 | −240.1 | −360.2 | 120.1 | −390.2 | −480.2 | 90.0 |
| 25,000 | 106.43 | −191.6 | −354.4 | 162.8 | −425.7 | −638.6 | 202.9 | −691.8 | −851.4 | 159.6 |

*The minus designation of the values in cps. in the table designates the value as down field from the megacycle value of the field.

atoms, i.e., carbons, oxygens, etc., will shield and affect the ability of the hydrogen atoms to orient in a magnetic field. It is this effect that allows the different types of hydrogens to be quantitatively viewed using nmr. Thus, the aromatic hydrogens, olefinic hydrogens and allylic hydrogens of a gasoline sample can be viewed separately and their quantitative ratios compared to give octane numbers.

By aromatic hydrogens are meant those which are on carbon atoms which form the hexagonal nucleus. Olefinic hydrogens are those which are on carbon atoms which are double bonded to other carbon atoms. Allylic hydrogens are those which are on carbon atoms, which carbon atoms are directly adjacent to double bonded carbon atoms.

The device of this invention consists essentially of a sample chamber of a continuous or stopped flow type which is in essence an nmr cell where frequency shift ($\tau$) band levels are viewed. It further comprises essential means to surround this sample chamber in a magnetic field of from about 1,000 to 25,000 gauss and a radio frequency (R.F.) source to impart an energy level of from about 4 to 110 megacycles to the sample chamber. There is also an R.F. detector antenna coil which detects the degree of resonance, that is, when that specific type of hydrogen is aligned in the magnetic field. In actual use, either the magnetic field or the R.F. input frequency is varied so as to view the different hydrogens present in gasoline, and for which a correlation with octane number rating has been found. What is essential in determining the band levels ($\tau$) in nmr is that the equation $$\nu = (\gamma/2\pi) H_o \quad (1)$$

be satisfied. In this equation, $\nu$ is the input R.F., $H_o$ the

It should be noted in this Table that the input R.F. varies in cycles per second, even while using megacycle range frequencies. For this reason, magnetic fields below 1 kilogauss are not very useful, since there is not a wide separation between the various hydrogen levels. It is also for this reason that field strength in the range of from about 2 to 15 kilogauss are preferred. This most advantageously includes the useful permanent and electromagnetics. Above about 20 kilogauss cryogenic magnets are required. These magnets give greater resolution (band separation), but are not particularly useful due to cost, bulk and sensitivity.

As also discussed, the input R.F. can be maintained constant and the field varied in order to satisfy equation 1. Table II sets out a series of useful radio frequencies in megacycles and the milligauss ranges for determining the allylic, olefinic and aromatic hydrogen contents of gasoline.

TABLE II

| Ho (gauss) | $\mu$ (mc.) | Allylic H (gauss)* | | | Olefinic H (gauss)* | | | Aromatic H (gauss)* | | |
|---|---|---|---|---|---|---|---|---|---|---|
| | | From | To | Range | From | To | Range | From | To | Range |
| 2,349 | 10.00 | −4.2 | −7.8 | 3.6 | −9.4 | −14.1 | 4.7 | −15.3 | −18.8 | 3.5 |
| 4,698 | 20.00 | −8.5 | −15.6 | 7.2 | −18.8 | −28.2 | 9.4 | −30.5 | −37.6 | 7.1 |
| 6,447 | 30.00 | −12.6 | −23.4 | 10.8 | −28.2 | −46.3 | 14.1 | −45.6 | −56.4 | 10.3 |
| 10,571 | 45.00 | −18.9 | −35.1 | 16.2 | −42.3 | −63.5 | 21.2 | −68.9 | −84.6 | 15.7 |
| 12,894 | 60.00 | −25.2 | −46.8 | 21.6 | −56.4 | −84.6 | 28.2 | −91.8 | −112.8 | 21.0 |
| 19,341 | 90.00 | −37.8 | −70.2 | 32.4 | −84.6 | −130.9 | 42.3 | −137.7 | −169.2 | 31.3 |

*The minus designation of the values in gauss in the table designates the value as downfield from the Ho (gauss) value of the field. As in the instance of varying the frequency, here in varying the magnetic field the resolution is greater for higher frequencies and field strengths. By resolution is meant that there is a greater banh ( ) separation in regard to the types of gasoline hydrogens.

In either of these main embodiments, that is, where the field is constant and the frequency varied, or where the frequency is constant and the field varied, the mode of varying can be by sweeping the full range, or by viewing only the pertinent ranges as by use of a step generator. Also useful when the frequency is to be varied, is the use of broadband sources which correspond to the range of the type of hydrogen to be viewed. The general means to vary a kilogauss field over a milligauss range consists of embedding with the faces of the magnet, or attaching to the surface, a coil which when energized by an applied current, will change the strength of the magnet. This current can be applied so as to be able to fully sweep the milligauss ranges of the allylic hydrogen, or olefinic hydrogen and aromatic hydrogen ranges, or can be applied to view each range by stepwise increases in current. In the embodiment of frequency variation, this is easily accomplished by applying the radio frequency to the coil antenna in a sweep or step technique. A very useful and economical method consists of having solid state devices for each frequency range.

By either technique, that is, sweeping a full range or stepping to each range, and in either embodiment of varying the field or frequency, the allylic hydrogen or olefinic hydrogen and aromatic hydrogen ranges should be cyclically completely viewed from 10 to 60 times per second. Such rates are particularly necessary for flowing samples, and will yield greater precision and accuracy. By viewing at such a rate, a series of readings can be averaged and this value displayed. This technique takes advantage of the difference between the response time of electronics and that of individuals.

The R.F. detector coil antenna, which is also positioned to surround the sample chamber, is energized at the resonance frequency and produces an output EMF which varies directly as the hydrogen content responsive at that level. This EMF is fed to a comparator which consists of a device which controls the magnetic field or frequency being scanned, and enters and averages the input EMF for that type of hydrogen during each full range or stepwise sweep. The comparator may operate in any one of two preferred modes. That is, it may separately average from 10 to 100 or more values for each type of hydrogen and then resolve the linear correlation with octane number, or it may resolve the linear correlation with octane number for each sweep and average from 10 to 100 or more values for subsequent display and/or recording. The correlation with octane number, Research Octane Number or Motor Octane Number, is a linear one and consists of the equations;

$$RON = X \text{ Aromatic } H + Y \text{ Olefinic } H + C \quad (2)$$

$$RON = Z \text{ Allylic } H + C \quad (3)$$

$$MON = X \text{ Aromatic } H + Y \text{ Olefinic } H + C \quad (4)$$

In these equations, X, Y and Z are constant amounts which provide the correlation of the quantitative value of the nmr peaks of the aromatic hydrogen content, olefinic hydrogen content and allylic hydrogen content with the octane number ratings. In other words, the octane numbers will vary directly as the variation of these hydrogen contents. These constant factors range in value from about 0.1 to 3. The constant C is added in to bring the directly correlating nmr value on scale with the octane number rating scale, which rating scale is an arbitrarily chosen one. In value, C ranges from about 50 to 85.

When in operation, the octane rating device should be calibrated for each different crude feedstock. For such calibrations, the CFR knock test engine is used. Once calibrated for a set feedstock, the instrument of this invention need not be checked against this primary standard except at wide intervals of time. However, prudent operation would suggest frequent primary calibration, although in many instances adjustment is not necessary.

The device of the present invention will now be set out in more detail using reference to the drawings.

FIG. 1 is a schematic of the embodiment of the device of this invention wherein the magnetic field is held constant and the radio frequency is varied. 1 is the sample chamber which is illustrated in detail in FIG. 3. 2 is a gasoline input flow conduit and 3 the exit conduit. 4 is the R.F. generator and may be of the sweep or step type. 5 carries the megacycle R.F. signal to the sample chamber coil antenna. 6 is the output leads from the R.F. detector coil of the sample chamber and 7 the signal comparator with feedback loop 8 to the R.F. generator. 9 is the octane number digital display and/or recording device with 10 the connection means to the signal comparator. FIG. 2 is a schematic similar to FIG. 1, but in this embodiment the magnetic field is varied while the frequency is maintained constant. In this embodiment, the feedback loop 11 from comparator 7 goes to 12 which adjusts the field strength of the magnet in chamber 1. 13 is the connection to the sample chamber. In this instance, 12 may be of the sweep or step type.

Figure 5:
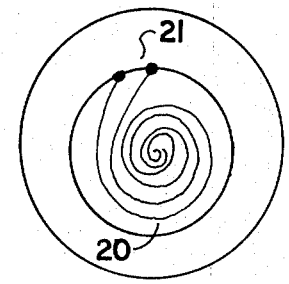
FIG. 5 is a sectional elevational view of a magnet pole face.

FIG. 3 illustrates the construction of the essential parts of the device within sample chamber 1. 2 and 3 illustrate the conduit through which the gasoline flows. This conduit may be from ⅛ to 3 inches or more in diameter. A preferred I.D. is ½ to 1 inch. In material construction, the pipe must be of a material having no interfering hydrogen bands, must not interfere or alter the implied magnetic field, and must be fully transparent to radio frequencies in the range of from about 4 to 60 megacycles or more. Preferred materials are quartz, Pyrex soda-lime, glass and teflon. 14 are the leads to R.F. antenna coil 15, with 17 being the R.F. detector antenna coil with leads 16. 18 and 19 are the poles of the magnetic. This is either a permanent or electromagnetic depending on its strength. The faces of both 18 and 19, for the embodiment where the magnetic field is varied, carries a coil 20 which can be sweep or step energized so as to alter the field strength of the magnet 18–19. FIG. 5 shows the face of the magnet with the sweep coil 20 embedded within its surface. Contacts 21 serve as the means for supplying sweep current to the coil.

Figure 4:
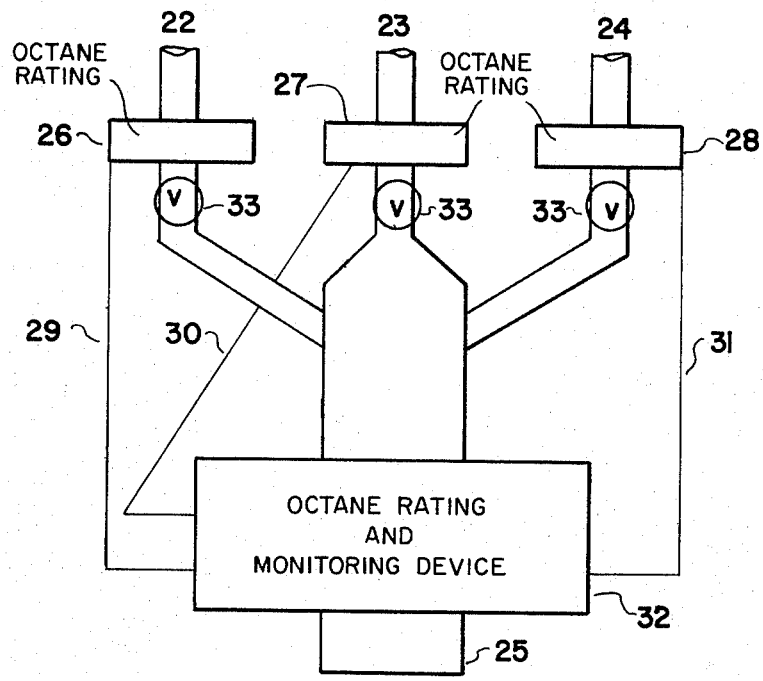
FIG. 4 is a schematic of the use of multiple octane rating devices to control gasoline blending plant streams.

FIG. 4 illustrates an extremely practical use of the present invention to monitor and control the octane number of a product gasoline. This system is most advantageously used at blending plants. The system in schematic comprises cracked fraction streams 22, 23 and 24 which are to be blended into a product gasoline stream 25. 26, 27 and 28 are octane rating devices of the present invention on the gasoline feed streams. 32 is an octane rating device of the present invention on the blended gasoline stream. 32 in this instance is also a correlating device which automatically can control valves 33 to produce the proper blend. 29, 30 and 31 interconnect octane rating device 32 with octane rating devices 26, 27 and 28. The advantage of a system such as this is that the gasoline streams can be continuously monitored.

In the embodiment of FIG. 4, it is evident that the octane rating devices are not on the feed streams themselves, but are on smaller diameter takeoff sampling streams which are then returned to the main stream. Further, a turbulent flow is desirable, therefore allowing simple takeoff and conduit means to be used.

The main embodiments of this invention are the essentially automatic octane rating device and the method of using this device. However, as is evident from this disclosure, a conventional laboratory nmr instrument, such as the Varian A 60, could be used to determine the allylic hydrogen, olefinic hydrogen and aromatic hydrogen contents of a gasoline. From this, the octane rating could be readily derived following the correlations and equations in this specification. One technique is to have a photoelectric or electromechanical curve follower quantitatively determine by integration the hydrogens of each pertinent band. From this output signal, a simple circuit can correlate the linear equation with graphical or digital direct reading of octane number. Further, once having the factual data of a graphical illustration, the octane number is even capable of mathematical calculation. In this regard, it is presently contemplated that this invention encompasses devices and methods of correlating the contents of the varying types of hydrogens in a gasoline sample with the octane number rating of the gasoline. The degree of sophistication of instrumentation, that is, circuit design, is within the skill of electronics designers once informed of the signal to be processed and the mode of processing it. This may thus range from a simple inexpensive device to one which, via various feedback loops, controls full plant operations.

As an example of use of devices of this invention, various samples of gasoline produced from a feedstock of West Texas Devonion Gas Oil are analyzed as to Research Octane Number by means of the CFR octane engine following ASTM D-903 and by the technique of the present invention. For this feedstock, the correlating equations are $$RON = \text{Aromatic H} + 1.55 \text{ Olefinic H} + 76.5 \quad (2)$$

$$(3) \; RON = 0.85 \text{ Allylic H} + 73.5 \quad (3)$$

In this example, these will be designated RON(2) and RON(3) techniques. In this example, the device of FIG. 2 is used, with the gasoline sample being in a stopped flow state. Also in this embodiment, the magnetic field is fully swept. In the runs following RON(2), X of comparator 7 is set at 1 and Y at 1.5. Z is in the off position. C is set at 76.5. In the runs following RON(3), X and Y are in the off position, with Z set at 0.85 and C at 73.5. The direct readout of the results from RON(2), RON(3) and the ASTM D-908 results are set out in Table III.

TABLE III

| Sample No. | ASTM D-908 | RON(2) | RON(3) |
|---|---|---|---|
| 1 | 87.8 | 87.7 | 87.7 |
| 2 | 90.8 | 90.7 | 91.0 |
| 3 | 89.0 | 88.6 | 88.4 |

In a further use of the device of FIG. 2, the motor octane number is readily determined for the same feedstock crude. The correlation in this instance is:

$$MON = 0.55 \text{ Aromatic H} + 0.27 \text{ Olefinic H} + 71.6$$

The comparison here will be with three samples of gasoline run on the CFR knock test engine following the procedure of ASTM D-357. For the runs on the device of this invention, X is set at 0.55, Y at 0.27 and C at 71.6. Z is in the off position. The results are set out in Table IV with MON(4) designating the values following the method of this invention.

TABLE IV

| Sample No. | ASTM D-357 | MON(4) |
|---|---|---|
| 1 | 86.0 | 85.4 |
| 2 | 86.9 | 86.5 |
| 3 | 84.8 | 85.3 |

Variations in the device of the present invention, and its use in conjunction varying processes, e.g., cracking, hydrocracking, are considered to be encompassed by the present invention. Further, other variations would be obvious in view of the instant disclosure.

What is claimed is:

1. A method for determining the octane number of a gasoline comprising:
   flowing gasoline into a sample chamber;
   contacting said gasoline with selected magnetic field and radio frequency signals effective to produce nuclear magnetic resonance of the olefinic hydrogen and aromatic hydrogen constituents of the gasoline;
   determining the total integrated resonant energy for each of said olefinic and aromatic hydrogen constituents; and
   correlating the total integrated resonant energy values to yield the octane number of the gasoline.

2. A method as in claim 1 wherein the magnetic field is in the range of from about 1 to 25 kilogauss and said frequency is in the range of from about 4 megacycles to 110 megacycles.

3. A method as in claim 1 wherein the magnetic field is maintained constant and the radio frequency is varied to produce nuclear magnetic resonance of the said hydrogens.

4. A method as in claim 1 wherein said radio frequency is maintained constant and the magnetic field is varied.

5. A method as in claim 1 wherein said octane number to be determined is research octane number, with the correlating of the total integrated resonant energy values being essentially by the ratio of $$(X \text{ Aromatic H}) + (Y \text{ Olefinic H}) + C$$

where X, Y and C are predetermined constants and H is the total integrated resonant energy value for the designated constituents.

6. A method as in claim 1 wherein said octane number to be determined is motor octane number, with the correlating of the total integrated resonant energy values being essentially by the ratio of $$X \text{ Aromatic H} + Y \text{ Olefinic H} + C$$

where X, Y and C are predetermined constants and H is the total integrated resonant energy value for the designated constituents.

7. A method as in claim 1 wherein the gasoline is in a continuous flow through said sample chamber.

8. A method for determining the octane number of a gasoline comprising:
   flowing gasoline into a sample chamber;
   contacting said gasoline with selected magnetic field and radio frequency signals effective to produce nuclear magnetic resonance of the allylic hydrogen constituent of the gasoline;
   determining the total integrated resonant energy for the allylic hydrogen constituent; and correlating the total integrated resonant energy value to yield the octane number of the gasoline.

9. A method as in claim 8 wherein said octane number to be determined is research octane number with the correlating of the total integrated resonant energy value being essentially by the ratio of $$Z \text{ Allylic } H + C$$

where Z and C are predetermined constants and H is the total integrated resonant energy value for the allylic hydrogen.

10. A method as in claim 8 wherein said magnetic field is in the range of from about 1 to 25 kilogauss and said radio frequency is in the range of from about 4 to 110 megacycles.

11. A method as in claim 10 wherein the magnetic field is maintained constant and the radio frequency varies.

12. A method as in claim 10 wherein the radio frequency is maintained and the magnetic field is varied.

* * * * *